Aug. 1, 1967  W. A. BARY  3,333,796
CLOSED TRACK AIRPORT WITH STRAIGHT RUNWAYS FOR INSTRUMENT
LANDING AND TAKE-OFF
Filed Sept. 27, 1965

INVENTOR
BY Waldeman A. Bary

ATTORNEYS.

3,333,796
CLOSED TRACK AIRPORT WITH STRAIGHT RUNWAYS FOR INSTRUMENT LANDING AND TAKE-OFF
Woldemar A. Bary, R.D. 1, East Stroudsburg, Pa. 18360
Filed Sept. 27, 1965, Ser. No. 490,241
10 Claims. (Cl. 244—114)

This invention relates to closed track airports.

It is an object of the invention to provide improvements in the closed track airport of my Patent No. 3,173,634. The compact, circular airport of that patent, with an infinite runway, and hence much greater safety, has been proven sound and practical by recent tests made by the United States Navy at the General Motors Desert Proving Grounds track near Mesa, Ariz. (Naval Aviation News, March 1965).

In that patent, it is explained that the circular track can be used with conventional blind landing electronic apparatus for guiding the plane along a straight course until touchdown. From there on, a conventional radar can be used to guide the aricraft on the ground on a circular course equipped with suitable reflectors to reflect the usual radar beam to the screen aboard the aircraft. The same radar guidance can be used for takeoff until the aircraft becomes airborne.

It is a specific object of this invention to provide a closed track airport with provision for larger and faster aircraft of high wing loading to continue on a straight course for a period after touchdown, especially during blind operation by way of instrumentation already in use or under test and development here and abroad.

Another object is to provide a circular curved track with a plurality of straight chordal runways at angularly spaced locations adjacent to the inside of the curved track and each of which extends into the curved track at a small acute angle so that an aircraft traveling at high speed can make a gradual transition from a straight to a curved run after touchdown, or shift to one of the chordal runways for takeoff.

This invention retains all the advantages of the closed track runway with its infinite length and resulting increased safety, and with its saving in required airfield area, while at the same time providing for touchdown and takeoff from straight sections of runway.

Another object is a substantial reduction of plane taxiing time between the runway and the pavilion for embarkment and debarkation, also between the pavilion and its hangars and also having the pavilion located closer to its parking lot.

A further object of this invention is to reduce the prevailing congestion in operation of several air lines from the same pavilion.

Other objects, features and advantages of the invention will appear or be pointed out as the description proceeds.

In the drawing, forming a part hereof, in which like reference characters indicate corresponding parts in all the views.

Figure 1:
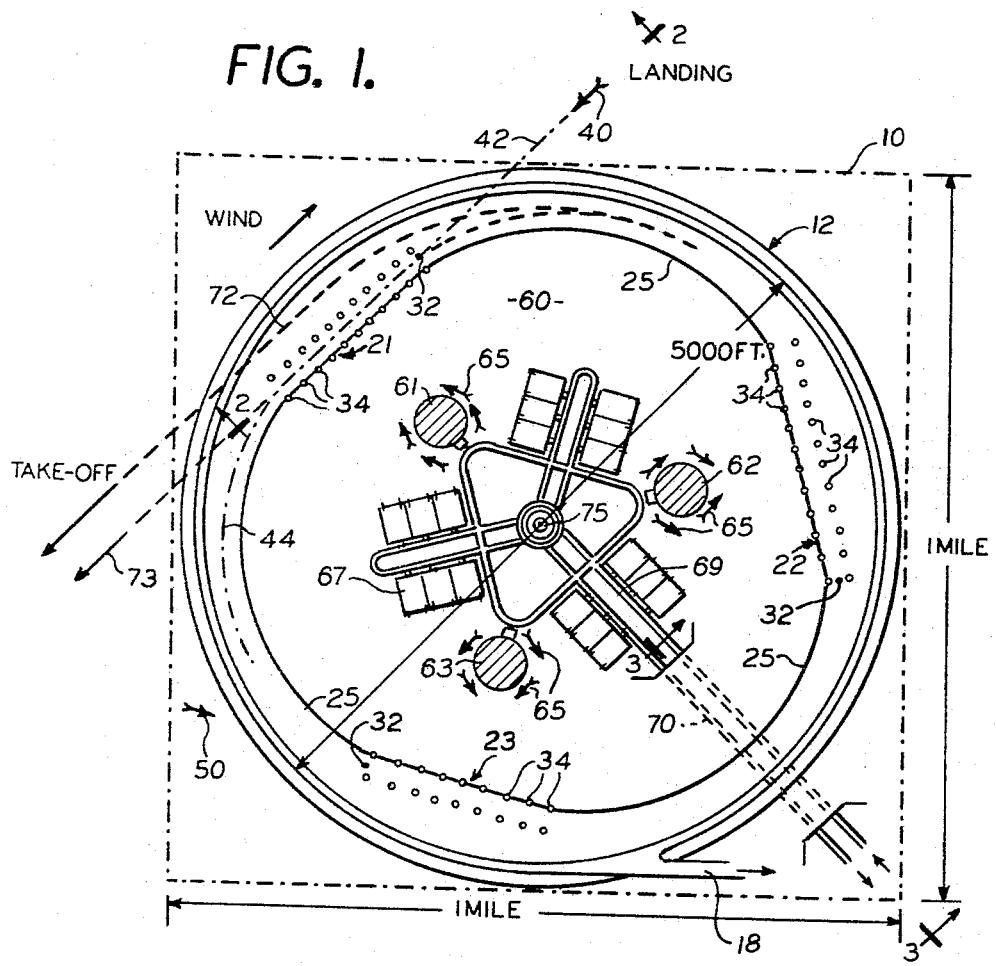
FIGURE 1 is a diagrammatic plan view of the airport having the improved closed track runway of this invention.
Figure 2:
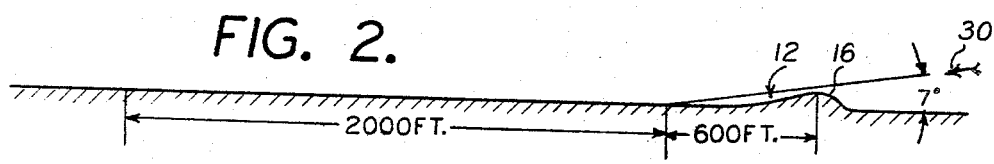
FIGURE 2 is an enlarged sectional view taken on the line 2—2 of FIGURE 1.
Figure 3:
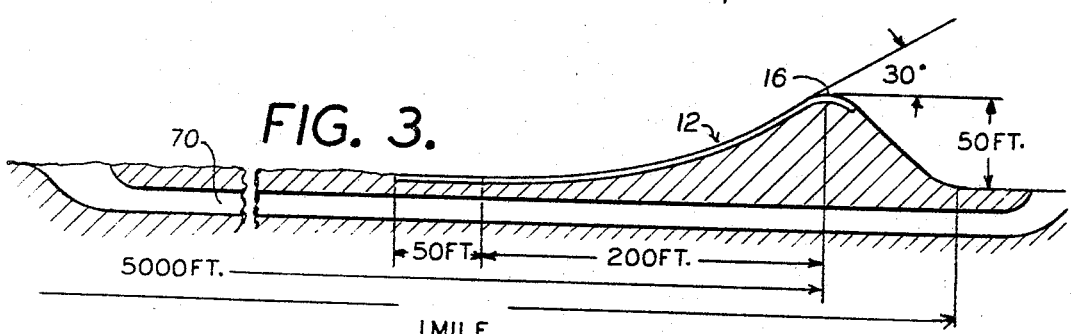
FIGURE 3 is a greatly enlarged sectional view taken on the line 3—3 of FIGURE 1.

FIGURE 1 shows an airport 10 having a curved closed track airstrip 12 which is shown as circular, though it will be understood that such a track can be elliptical or have other deviations from a true circle, though the uniform curvature of a circlcle is preferred. The track 12 is banked across most of its width, as shown in the sectional views of FIGURES 2 and 3, and the slope or bank of the track 12 increases from substantially flat to a maximum angle of 30°, as shown in FIGURE 3, along a line which is substantially parabolic. In a track having a width of 250 feet, the first 50 feet of width is level and flush with the ground inside the ring formed by the track; and the next 200 feet of width is banked, as already described. This gives the outside of the track 12 an elevation of approximately 50 feet. The outside diameter of the track can be 5,000 feet and the airport can be located within one square mile. If progress and evolution in aviation result is heavier aircraft with higher landing speeds, it may be desirable to have a larger ring track diameter, wider track and higher ring wall. However, once a firm operation technique has been established, even a smaller standard ring diameter could be adopted. Actual dimensions are given in this application merely by way of illustration.

At the highest point of the track 12, the bank reverses its curvature across a hump 16 and the ground beyond the hump 16 slopes downwardly at an angle of approximately 45° around all of the track 12 except at a ramp 18 (FIGURE 1) where there is a roadway leading down from the hump at a slow angle for use where aircraft are to be towed over the hump 16 when taking aircraft into or out or the airport along the ground.

In the construction illustrated, the track 12 is paved across its entire width and for a short distance across the hump 16. Narrower tracks can be used, if desired, but the track must not be made so narrow that the rise in the ground level resulting from the banking of the track, will cause the wing tips of an aircraft of wide wing span to strike a portion of the runway that is outward from the aircraft wheels and higher than the portion of the track on which the wheels are located.

At landing, a large aircraft with heavy wing loading and high landing speed following the beam requires a straight course of approach and to avoid a possible slip on the wing demands a lateral or spanwise level approach for a safe touchdown, same to be made on a straight, level and wide and long-enough stretch of runway. This applies to both instrument blind and pilots' manual landings. It is desirable that the aircraft have the opportunity to continue on the straight course for some period after touchdown, thus making the exact point of landing less critical. This period should be long enough time for the pilot or the instrumentation, while the aircraft is still rolling on a straight course, to switch the aircraft from a straight to a circular regime. Possible overshooting of the intended point of touchdown requires some margin of length on the straight stretch.

In order to meet this requirement for blind landings with provision for continuing the straight run for a period after touchdown, the airport 10 is provided with a plurality of chordal tracks 21, 22 and 23 located at angularly spaced regions adjacent to the circular track 12. With the track 12 which is shown in the drawing, the chordal tracks 21–23 are each about 2,000 feet long and 100 to 200 feet wide, and they are located symmetrically on a triangular pattern and in accordance with prevailing winds or other local requirements. The tracks 21–23 are straight and level.

Each of the three chordal tracks 21–23 has its opposite ends merging with the circular track 12 and is flush with the substantially level inner edge portion of the track 12. At the regions between the chordal tracks 21, 22 and 23, the circular track 12 is preferably made wider and has arcuate sections 25 which are level, or substantially so, and which constitute inward extensions of the substantially level portion of the rest of the track 12 inward from the banked portion.

The chords formed by the tracks 21–23 preferably have a length not greater than the radius times the square root of two so that these straight chordal tracks 21–23 merge into the circular track 12 with small acute angles which permit gradual transition of the aircraft from the straight to the circular regime, as indicated by the dotted lines 42 and 44 at the top of FIGURE 1, indicating the course of travel of an aircraft 40 which lands on the chordal track 21.

Each of the chordal tracks 21–23 has at its entrance end a flush radar beam outlet for guiding the aircraft to a touchdown, these outlets being indicated by the reference character 32 in FIGURE 1. Each of the chordal tracks 21–23 is bordered on each side by a row of concealed radar reflectors indicated by the reference characters 34. Similar reflectors are located around the circular track 12. It will be understood that the chordal tracks 21–23 and the circular track 12 are equipped with lights, in accordance with conventional practice.

FIGURE 1 also shows an aircraft 40 approaching the chordal track 21 along a straight course 42 and guided by the radar beam from the outlet 32 in the track 21. This aircraft 40 follows the course shown in the long broken lines 44 in changing from the straight to the circular regime. An aircraft 50 is shown approaching the chordal track 23. At any time, an aircraft approaches the airport for a landing on a straight course following the orders from the tower and the beam released by the tower from the outlet 32 of the assigned chordal track, depending upon the direction of the wind. On the approach to the chordal track, the aircraft 30 (FIGURE 2) clears the hump 16 and will not require an angle of descent in excess of 7° to the horizontal.

Since the landings are made at a straight course and on a straight and level strip, and only thereafter the ground rolling is made on a circular path, the steepness of banking and the radii of the circular track conform to the regular practice of modern highway construction with no regard to permissible banking of heavy wing loaded aircraft in the air. Hence, the superelevation for a curved track with a radius of 2,500 feet at its highest travel region, for a maximum speed of 140 m.p.h. (the minimum flying speed for a Boeing 707 airliner as the most popular current airliner) is .175 foot per each foot of track's upgraded width. The above is based on formulas and table data from such manuals as the "Transition Curves for Highways" by Joseph Barnett, P.R.A., and "Concrete Pavement Manual," Portland Cement Association. At such a superelevation of .175 a Boeing 707, with a wing span of about 130 feet, will have at all times and at any point of the track a wing tip clearance to the ground of a minimum of six feet, a comfortable margin for the pilot.

Superelevation of .175 is obtained from the following formula of the above referred-to manuals:

$$S = 0.067 \frac{V^2}{R} - F$$

where

S is superelevation in feet per foot of upgrading
V is ¾ design speed in m.p.h. (105 m.p.h.)
R is radius of track curve in feet (2,500 feet)
F is side friction coefficient (0.12)

$$S = 0.067 \frac{105 \times 105}{2,500} - 0.12 = .175$$

Hence, for a plane rolling at 140 m.p.h. on a circular track, the upgraded superelevation of its width has to be .175, and at the center region of its high speed zone should have a banking angle of about 20 degrees to the horizon.

After touchdown, if the aircraft has a landing speed of 100 miles per hour, it has 13.66 seconds of time available before reaching the buffer portion of the circular track 12; and at a landing speed of 150 miles per hour, the aircraft has 9.09 seconds. Even at a landing speed as high as 200 miles per hour, the aircraft can roll on the straight chordal track for 6.81 seconds before changing from a straight to a circular regime, thus allowing time enough for the switch. These examples of time, are of course reduced by any overshooting of the intended point of touchdown, but they are ample in view of the small acute angle at which the chordal tracks merge with the circular track and the effect of the bank of the circular track in bringing the aircraft from the straight to the circular regime.

To counter centrifugal force, flaps of the aircraft can be shifted from joint to separate action as described in my patent, already referred to herein.

After following the curved track 12 to lose enough of its speed, the aircraft enters an inner ring 60 at a point nearest to its pavilion of debarkation. Three such pavilions are shown in FIGURE 1 and designated by the reference characters 61, 62 and 63. Aircraft 65 are shown located at the various pavilions 61–63. Between the pavilions 61–63 there are hangars 67, and there are roadways 69 leading to and from the inner ring 60. One roadway 69 passes through a tunnel 70 under the track 12 to the outside of the airport. Between each pavilion and the tower 75 there is a parking lot 72.

After an aircraft has loaded at one of the pavilions 61–63, it enters the curved track 12, or a straight strip at the nearest to the pavilion point, at the inner ring track 25 it has an endless path to run on and can make as many loops around the track 12 as the type of aircraft and its particular loading at the time may require. When the speed is high enough for a steep and safe climb, and preferably higher than on a conventional straight-runway airport, the pilot may take off directly into the wind at the appropriate location along the track 12, along a tangent course 72, or can take off from a straight track along a course 73 by merely turning into the chordal track 21, if that track is the one extending most nearly in the direction of the wind at the time of takeoff. By taking off at a higher-than-usual speed on a conventional straight course and always directly into the wind, which is only possible on a circular airport, the aerodynamic adverse effect that may occur from an air current at the hump of the ring can be disregarded.

Since the pilot has an endless path to run on, he is not limited to a predetermined run length to reach the needed lifting speed for a safe takeoff. Hence, the required plane acceleration can be obtained with more time and with a greater distance covered, but without the risk of dangerously racing the engines to their ultimate power and possibly resulting engine failure with a crash. Also, the takeoff is made with less than the usual excess engine roar, so perturbing to the neighborhood.

On a straight runway, once the pilot has started with his enginees wide open, he passes "the point of no return," whereas on a closed track, he always has a chance for a safe return for engine recheck. Also, with the available margin of power, the use of engine-muffing devices is practical, since the power for takeoff is no more than that required for a climb in normal flight.

Another advantage of the airport of this invention is that the operating pavilion facilities can be divided into three groups, with each pivilion close to its own section of parking lot and to the hangars of the corresponding airline, and especially that all pavilions are close to some section of the closed track. Therefore, the plane taxiing is greatly reducing.

This reduces the congestion of operation, as compared with numerous airlines operating from one pavilion. Of course, the airport is managed from a single tower 75 on top of an administration building in the center of the airport, surrounded by three separate parking lots.

The preferred embodiment of the invention has been illustrated and described, but changes and modifications can be made and some features can be used in different combinations without departing from the invention as defined in the claims.

What is claimed is:

1. An airfield including a curved runway forming an endless track, a second track that is straight and which merges into the curved track at each end of said straight track and at angularly spaced locations along the inner edge of the curved track so that the straight track is a chord of an arc of the curved track whereby aircraft using the curved track can make the first part of their landing run and the final part of their takeoff run on the straight chordal track, the straight track being substantially flat and the curved track being banked and progressively steeper toward its outer edge but becoming substantially flat at its inner edge where it merges with the ends of the straight track, the length of the straight track being substantially less than the diameter of the circular track.

2. The airfield described in claim 1 characterized by there being a plurality of straight tracks forming chords of arcs of different sections of the curved track at angularly spaced locations adjacent the curved track, the chordal extent of each of the straight tracks being substantially less than 90° of the circular track.

3. The airfield described in claim 1 characterized by the curved track being wider at each end of the chordal track than along that part of the curved track that is subtended by the chordal track, and the additional width of the curved track being at the inside and being substantially level with and constituting a curved extension at each end of the chordal track.

4. The airfield described in claim 1 and in which there are a plurality of chordal tracks at angularly spaced regions around the circular track.

5. The airfield described in claim 4 characterized by three chordal tracks at equally spaced locations around the circular track.

6. The airfield described in claim 5 characterized by the angular spacing between the chordal tracks being greater than the arcs subtended by the chordal tracks.

7. The airfield described in claim 4 characterized by each of the chordal tracks subtending an arc of less than 90° of the circular track whereby the change in course of an aircraft passing from the chordal to the curved track and vice versa, is a small acute angle.

8. The airfield described in claim 4 characterized by the chordal track having a length not greater than 1.42 times the inside radius of the curved track.

9. A closed track airport having a ground area surrounded by the track, a plurality of passenger pavilions for different airlines at different locations radially outward and angularly spaced from one another around the middle of said area, and hangars for the respective airlines located on the ground area and close to the corresponding pavilions for reducing taxiing time of aircraft between the hangars and pavilions and between the pavilions and the track, and characterized by the track being substantially circular and also having straight chordal runways substantially shorter than the inside diameter of the circular track and adjacent to the inside of the circular track and at angularly spaced locations along the inside of the circular track, there being a different chordal runway closer to each pavilion than is the circular track.

10. A closed track airport having a ground area surrounded by the track, a plurality of passenger pavilions for different airlines at different locations radially outward and angularly spaced from one another around the middle of said area, and hangars for the respective airlines located on the ground area and close to the corresponding pavilions for reducing taxiing time of aircraft between the hangars and pavilions and between the pavilions and the track, and characterized by there being a roadway connecting all of the pavilions with the land outside of the closed track and a tunnel under the closed track for said roadway, and a parking lot for each of the pavilions located closer to that pavilion than to the other pavilions.

References Cited

UNITED STATES PATENTS

| | | | |
|---|---|---|---|
| 2,400,841 | 5/1946 | Rogers | 244—114 |
| 3,157,374 | 11/1964 | Conrey | 244—114 |
| 3,173,634 | 3/1965 | Bary | 244—144 |

MILTON BUCHLER, *Primary Examiner.*

P. E. SAUBERER, *Assistant Examiner.*